May 7, 1935.  C. A. THOMAS ET AL  2,000,050
PIGMENT
Filed April 26, 1930
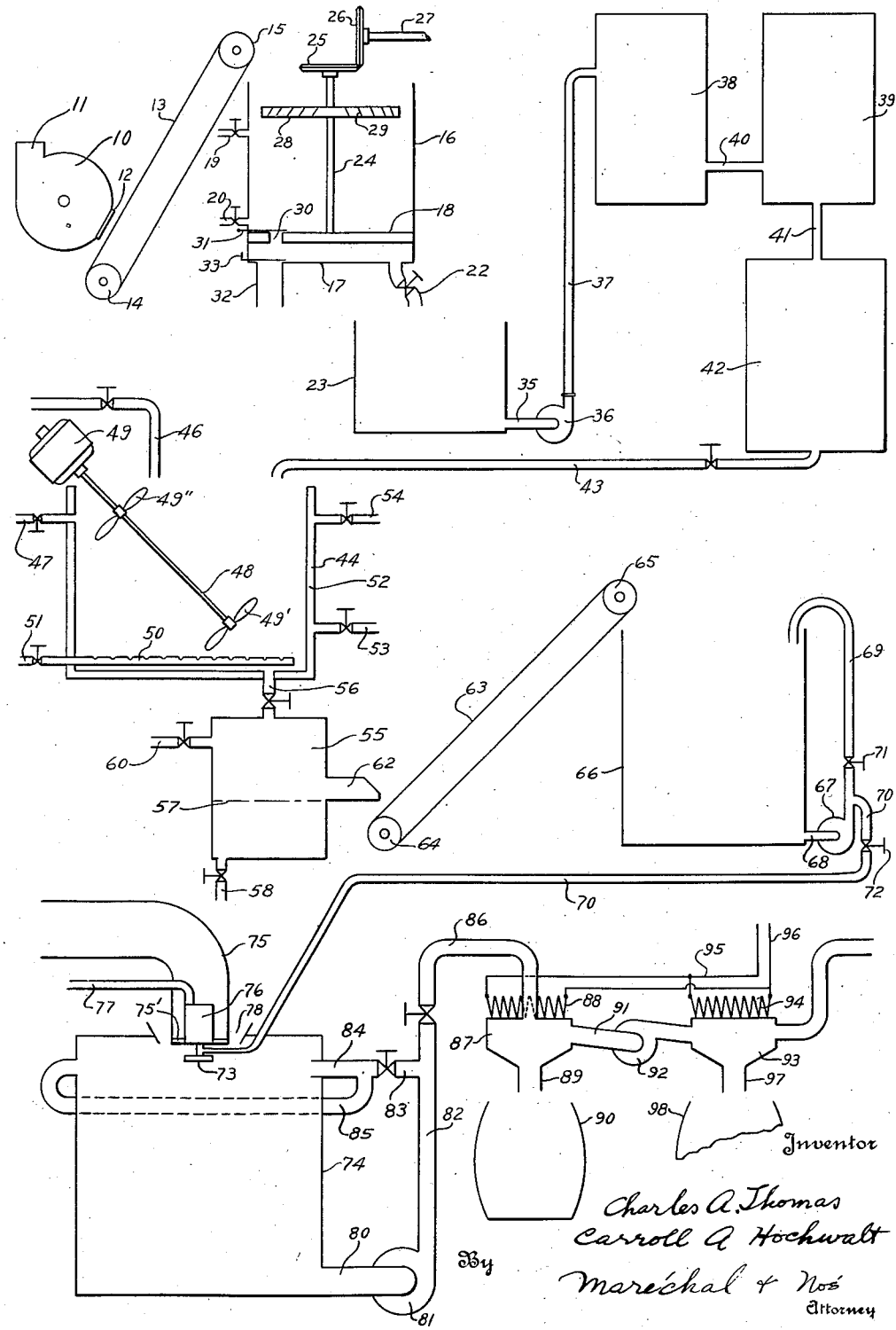
Inventor
Charles A. Thomas
Carroll A. Hochwalt
By Maréchal & Noé
Attorney Patented May 7, 1935

2,000,050

UNITED STATES PATENT OFFICE 2,000,050

PIGMENT

Charles A. Thomas and Carroll A. Hochwalt, Dayton, Ohio., assignors to The Mead Research Engineering Company, Chillicothe, Ohio, a corporation of Ohio Application April 26, 1930, Serial No. 447,535

9 Claims. (Cl. 134—58)

This invention relates to pigment and its manufacture.

One of the principal objects of the invention is to produce a superior pigment of good color and fine particle size at a relatively low cost.

Another object of the invention is to produce a pigment from liquor resulting from the leaching of certain kinds of wood with water, such as tannin extract resulting from the leaching of deciduous wood such as chestnut.

Another object of the invention is to provide a method of producing pigment of this character which is simple and easily carried out, and which permits utilization of relatively cheap by-product materials with the production of a high grade pigment.

Still another object of the invention is to provide apparatus for carrying out the above method and for producing the above product.

Other objects and advantages of the invention will be apparent from the following description, the accompanying drawing and the appended claims.

In the drawing, the single figure is a diagrammatic illustration of apparatus constructed for carrying out the method and producing the product of this invention.

We have discovered that a high grade pigment can be prepared in accordance with our invention from the leach liquor resulting from the steeping of certain types of fibrous material containing tannin ingredients with leaching liquor such as water, such leach liquor being known as tannin extract. By way of example, this invention is particularly described herein with reference to the treatment of tannin extract derived from leached chestnut chips.

Referring to the drawing, in which a preferred embodiment of apparatus for carrying out the method of this invention is illustrated, 10 indicates a chipper for wood adapted to reduce the same to small pieces or chips. The chipper 10 may be of conventional construction having a feeding inlet 11 through which logs are fed, and revolving cutting knives, (not shown) within the interior of the casing for reducing the logs to chip size. The resultant chips are discharged through opening 12 onto a traveling conveyor 13 supported on rollers 14 and 15, and are conveyed and discharged into a leaching tank 16.

The leaching tank 16 is shown as a cylindrical open tub, having a bottom 17 and a spaced false bottom 18 which may be a perforate grid or lattice work. The tub 16 is filled to the desired level with chips by conveyor 13, and then leach liquor or water is introduced onto the chips, such as by valve controlled spray pipe 19, and steam is supplied by valve controlled pipe 20. While only a single leaching tank is illustrated herein, it is to be understood that any desired number of leaching tanks may be used, and that suitable liquor circulating connections may be provided between the various tanks so that the liquor may be passed through these tanks in series in the customary manner as practiced in the tannin extract industry. After the leaching action is completed, the leach liquor is drained from the tank through valve controlled discharge pipe 22 into a suitable storage or settling tank 23. The chips remaining in the tank after draining are then removed in any suitable manner. As illustrated, the tank is provided with a leach caster having a central vertical shaft 24 supported in suitable bearings and adapted to be driven by intermeshing gears 25 and 26 from a drive shaft 27. The shaft has slidably mounted thereon but keyed for rotation therewith an arm 28 adapted to rest upon the upper surface of the chips, and having suitable inclined blades or fingers 29 for moving the chips to the periphery of the leaching tank. The perforate grid 18 is provided with an opening 30 controlled by a slide valve 31 which is in alignment with a chip discharge 32 in the bottom of the tank and controlled by a slide valve 33. During the extraction operation and the draining of the extracted chips, the valves 31 and 33 are kept closed, but when it is desired to remove the chips from the tank these valves are opened while the valve controlled pipe 22 is closed, and then the leach caster including the shaft 24 and arm 28 is rotated so as to feed the chips to the periphery of the tank where they fall through the aligned openings 30 and 32.

The tank 23 is provided with an offtake 35 supplying a pump 36 which discharges through pipe 37 into suitable evaporating apparatus, such as conventional multiple effect evaporators 38 and 39 connected by pipe 40. In these evaporators, the extract liquor is concentrated to a suitable consistency, generally to a viscous mass of the consistency of molasses. If desired, the extract liquor may be used in dilute consistency as received from the extract tank without concentration. When a pigment plant is associated with an extract plant, it is of course more economical to use the dilute extract as prepared in the leaching operations, or only a somewhat concentrated extract to give the optimum conditions of concentration for the preparation of the pigment, thereby avoiding the expense of substantial concentration. But where the extract liquor is shipped, it is desirable to first concentrate the leach liquor, such as from a concentration of about 5% total solids as obtained in the leaching operation to a concentration of about 50% total solids for shipment. The solid content of the leach liquor as generally obtained in practice contains roughly about 50% by weight of so-called "tan" ingredients such as tannic acid, and about 50% by weight of various constituents making up the so-called "non-tans". The evaporators discharge by pipe 41 into a suitable storage tank 42 which in turn is connected by valve controlled pipe 43 with a mixing tank 44.

In this mixing tank, the pigment precipitate is produced from the leach liquor. A valve controlled pipe 46 communicates with a suitable supply tank containing a prepared solution of a heavy metal compound. Where a black pigment, such as is suitable for printer's ink, is desired, an iron compound, such as ferrous hydroxide $Fe(OH)_2$, gives very good results. Certain other heavy metal compounds give other types and colors of pigments with leach liquor of this character. Thus, for example, titanium chloride $TiCl_3$ gives an orange red precipitate; vanadium trichloride $VCl_3$ gives a green pigment; ammonium vanadate $NH_4VO_3$ gives a black pigment; mercurous nitrate $HgNO_3$ gives a yellow pigment; and cuprous chloride $CuCl$ gives a brown pigment. The black precipitate produced with ferrous hydroxide is of superior character, having good covering power, and is water insoluble. The method of the present invention is hereinafter particularly described with reference to the production of the black pigment by the use of ferrous hydroxide, although it may be carried out in a similar manner for the production of pigments of other characteristics and color by the employment of the particular heavy metal compound to give the desired pigment. Ferrous sulfate may be used as an economical supply of an iron compound for the formation of ferrous hydroxide, inasmuch as ferrous sulfate is a by-product of certain chemical industries and it is available at low cost. A calculated amount of the ferrous sulfate solution is introduced into the mixing tank by pipe 46, and then a proportional quantity of a suitable alkaline compound which is active to react with the ferrous sulfate to produce ferrous hydroxide is introduced by valve controlled pipe 47. The reaction mixture is agitated by a suitable stirrer 48 driven by motor 49 mounted upon the tank. A readily soluble alkaline compound is preferably used, such as compounds of the alkali metals, including ammonia, which is active to precipitate the ferrous hydroxide in the reaction mixture. Satisfactory results may be secured with alkali metal hydroxides and carbonates for this precipitation of the ferrous hydroxide. It is found preferable to prepare the ferrous hydroxide at the time of use, inasmuch as this compound is unstable and oxidizes upon standing to the ferric form which does not give as good results. It is found preferable to use a high speed stirrer to give an effective agitation, as this appears instrumental in decreasing the particle size of the pigment with improvement in the quality of the resulting pigment. Thus good results are secured with a stirrer operating at a speed of about 1200 to 1800 R. P. M., and having a plurality of stirring blades 49' adjacent the lower portion of the mixing tank to operate beneath the level of the mixture within the tank, and a second set of stirring blades 49" adjacent the upper portion of the tank to operate preferably just above the liquid level to beat down the foam which is generally produced in copious amounts during the treatment.

A calculated amount of tannin extract is then introduced by pipe 43, while the mass is being agitated by the high speed stirrer 48. Good results are obtained by the introduction of the tannin extract gradually in a controlled stream during the vigorous agitation of the mass. The reaction mixture is at this time dark brown in color, being a colloidal suspension of the ferrous hydroxide mixed with the tannin extract solution. The mass is then treated with an oxidizing medium, such as by bubbling air through the mass by the bubbling pipe 50 supplied with air under pressure by valve controlled supply pipe 51. Considerable foaming takes place when the air blast treatment is started, and the treatment with air is generally continued until this foaming has substantially ceased or until substantially complete oxidation of the pigment precipitate is obtained. During this treatment, a precipitate settles out of the solution, which in the case where ferrous hydroxide is used is a bluish black precipitate highly insoluble in water such as to avoid substantial discoloration of clear water when filtered through the pigment precipitate. The exact composition of this precipitate is not definitely known, but it is probably a complex precipitate of iron tannate. If desired, the mixing tank and its contents may be heated by a suitable heating jacket 52 having valve controlled steam or water inlet and outlet connections 53 and 54.

It is found that better results and a higher yield of pigment are secured by properly proportioning the amount of ferrous sulfate or ferrous hydroxide used in accordance with the amount of extract, or total solid content thereof, being treated. Thus, with a particular tannin extract secured from a certain kind of chestnut wood, it is found that optimum results and yield are secured when about 50 to 60 parts by weight of ferrous sulfate are used to 100 parts by weight of concentrated tannin extract containing about 50% total solids. As an example of very satisfactory commercial operations, the following is mentioned. About 1030 pounds of ferrous sulfate are placed in solution in about an equal or somewhat greater weight of warm water. To this solution is added during agitation a controlled stream of alkaline solution, such as a caustic soda solution containing about 310 pounds of NaOH in a sufficient quantity of water to place the NaOH in solution, or a sodium carbonate solution containing about 410 pounds of $Na_2CO_3$, the quantity of alkali being calculated to effect precipitation of substantially all the ferrous sulfate to ferrous hydroxide. To this mixture is then added during the high speed agitation a stream of tannin extract, until about 2350 pounds of tannin extract containing about 50% total solids has been added. The addition of the tannin extract with its acid content renders the water solution acid or non-alkaline, which is found desirable for obtaining the highly water-insoluble bluish black pigment precipitate during the subsequent oxidation treatment.

The mass is then diluted with water to a total volume of about 400 gallons, and then air is bubbled through the mass while continuing the agitation for about two to four hours, or until substantially complete oxidation is insured. Under the above conditions, a yield of about 1500 pounds or over of pigment has been obtained.

A conventional type of filter press 55 communicates with mixing tank 44 by valve controlled pipe 56. After the air blast treatment, the reaction mixture is filtered, preferably while hot, through the filter 55, the precipitate being caught on the filter as indicated at 57 while the filtrate escapes through valve controlled discharge pipe 58. By filtering the mixture while hot, the alkali metal sulfate such as sodium sulfate, which is formed in the reaction, is maintained in solution and does not precipitate out to objectionably lighten the color or otherwise impair the quality of the pigment. For the purpose of warming the mass prior to filtering, mixing tank 44 is provided with a heating jacket 52 having valve controlled steam or water inlet and outlet connections 53 and 54. This jacket may also be used to control the temperature of the reacting mass, if desired, during the precipitating operation, although this is generally not required as good results are obtained at normal atmospheric temperatures. The precipitate is then washed by means of hot water introduced through valve controlled pipe 60 until the water soluble compounds have all been substantially removed. Care is taken to not permit the filter cake to dry, inasmuch as it has a tendency to cake together, and it is desirable to maintain as fine a particle size of the precipitate as possible.

After washing, the filter cake which generally retains a considerable proportion (about 60 to 70%) of water in the cake, is forced out of the press in the usual manner through the discharge 62 onto a traveling conveyor 63 supported on rolls 64 and 65 and discharged into an agitating tank 66. The tank 66 is provided with suitable agitating mechanism, a very satisfactory form of which is a recirculating pumping means, illustrated as the centrifugal pump 67 having its intake communicating with the tank through pipe 68 and its discharge communicating with return pipe 69 which delivers the material back into the top of the agitating tank. The filter cake received from the filter press is recirculated by the pump 67 in this manner until it is broken up into a very fine particle size, being at this time in the form of a relatively thick water suspension.

The discharge side of pump 67 also communicates with pipe 70, the branch pipes 69 and 70 being supplied with respective control valves 71 and 72. During the recirculation and agitation, valve 72 remains closed while valve 71 is open. After the material is broken up into a suitable particle size, valve 71 is closed and valve 72 opened, so that pump 67 serves to force the precipitate suspension through pipe 70 to a suitable atomizer 73 of a spray drier 74. Here the precipitate is introduced into heated air currents so as to effect rapid drying while at the same time avoiding undue heating which is apt to produce decomposition of the precipitate with resulting deterioration in the quality and color of the pigment.

A very satisfactory form of spray drier for this purpose is that known as the Peebles spray drier. This comprises a desiccating tank 74 to which highly heated air is supplied by pipe 75 from a suitable heater or oil burning furnace (not shown). The pipe 75 is adapted to introduce the heated air centrally of the top of the desiccator through a diffusion ring 75' which imparts a whirling or vortex motion to the highly heated air column within the desiccator. Mounted within the pipe 75 at the top of the desiccator is a steam turbine 76 to which operating steam is supplied by pipe 77, the turbine driving the atomizer 73 at a high rate of speed, such as about 15,000 R. P. M. Surrounding the pipe 75 in the top of the desiccator is an annular vent 78 through which cold air from atmosphere is drawn in to the desiccator during operation. The lower portion of the desiccator is connected by pipe 80 with the inlet side of an exhauster 81 which discharges into offtake pipe 82. A valve controlled pipe 83 is tapped into the pipe 82 on the discharge side of the fan 81, and is connected by branches 84 and 85 to the interior of the desiccator 74. The discharge ends of the branches 84 and 85 open tangentially adjacent the periphery of the interior space of the desiccator, so as to set up a whirling motion of cooler air within the outer portion of the desiccator opposite in direction to the whirling motion of heated air from the pipe 75. This sets up a counter vortex of air within the desiccator, so that the whirling highly heated air is at all times surrounded by oppositely whirling currents of cooler air, and so that the heated air is confined to a central column.

In the operation of the spray drier, the suspension of pigment is atomized into a very fine particle size by the high speed atomizing disk 73. These fine particles are thrown outwardly through a zone of small extent of highly heated air, such as air at about 500° F., and thence into areas of cool air introduced by the vent 78 and by the pipes 84 and 85. The fine particles of pigment are thus subjected to the highly heated air only for a few seconds, and then passed into the cooler zone so that their character is not injured although effective drying is secured. The air currents with the pigment entrained therein escape by the offtake 80 and are forced through the discharge pipe 82. The pipe 83 is of such size, or is so controlled by its valve, that only a relatively small proportion of the air with entrained pigment which is exhausted by the pump 81 is returned to the desiccator through the branches 84 and 85. In any event, the pigment which is recirculated in this manner is not again subjected to the highly heated zone of air but is discharged only into the outer whirling zone of cooler air within the desiccator.

The major portion of the air currents with entrained pigment pass through valve controlled discharge pipe 86 into a separating or precipitating chamber 87 provided with electrical precipitating means, such as a Cottrell precipitator 88. The particles of pigment thus separated from the air currents pass through the discharge 89 into a collecting vessel or barrel 90. Any pigment particles not separated at this point pass with the air currents through offtake 91 and are forced by fan 92 into a second settling chamber 93 provided with an electrical precipitator 94. The several electrical precipitators may be connected in parallel to the service lines 95 and 96 as shown. At this point, additional separated pigment passes through the offtake 97 into collecting vessel 98.

It is found that where a pigment of very fine particle size is obtained, it is desirable to use an alkali metal carbonate as the alkaline material for converting the ferrous sulfate into ferrous hydroxide. The very finely divided pigment produced by the use of sodium hydroxide as the reacting chemical is highly reactive, and spontaneous combustion of resulting pigment has occurred where the pigment is stored or shipped in considerable bulk. However, this objection has not been found to apply to the finely divided pigment produced with an alkali metal carbonate, and a larger yield is also generally secured with an alkali metal carbonate. A very satisfactory alkaline material of this character for the precipitation of the iron compound to ferrous hydroxide is the black liquor resulting from the cooking or digestion of fibrous material in the paper industry, for example, the black liquor resulting from the conventional soda process which contains a substantial proportion of carbonate of sodium. This black liquor contains dissolved lignins from the fibrous material, and is found to give a higher yield of pigment of good quality. Where an alkali metal carbonate, or black liquor containing a substantial proportion of carbonate, is used in the manner described above, increased foam results when the reaction mixture is treated with the air blast, and this appears to also improve the quality of the pigment by further decreasing the particle size thereof.

It is found that the incorporation of a suitable material, such as carbon black, with the pigment is effective in reducing the danger of spontaneous combustion of the pigment when stored in bulk. Thus very satisfactory results are secured by the incorporation of about 10% by weight of carbon black with 90% by weight of the pigment, the resulting material having improved tinting strength.

In the production of tannic acid in commercial operation, improved results are obtained by permitting the tannin extract obtained from the leach casters 16 to stand within suitable tanks for several days. During this storage of the leach liquor, a sludge settles out of the tannin extract, and the extract may then be removed from the sludge as by decanting to give an extract of increased purity. The settled sludge thus produced gives a very satisfactory pigment when treated in accordance with the present invention as outlined above, a higher yield of pigment from a given quantity of sludge being generally obtained than from the same quantity of extract. The separated liquor can also be used in the manufacture of the pigment, if desired, although where the entire tannin extract is used in this manner, the sludge would not ordinarily be separated but the entire extract would be used for purposes of economy. If desired, a pigment plant may be associated with an extract plant, the separated sludge being supplied to the pigment plant, while the purified extract from which the sludge has been removed can be supplied for tanning leather, or other purposes.

Thus in accordance with this invention, a high grade pigment is produced from readily available and cheap products, such as leach liquor or tannin extract and ferrous sulfate. Considerable quantities of tannin extract are available at extract mills, and black liquor can be obtained from paper plants associated with such mills. The pigment produced with ferrous hydroxide is bluish black in color and has good tinting strength. This pigment is substantially neutral in reaction and does not retard the drying properties of linseed oil.

While the forms of invention herein described constitute preferred embodiments thereof, it is to be understood that the invention is not limited to these precise forms and that changes may be made therein without departing from the scope of the invention which is defined in the appended claims.

What is claimed is:

1. In the manufacture of pigment, the method which comprises mixing ferrous hydroxide with a non-alkaline tannin extract derived from chestnut wood, then bubbling an oxidizing fluid such as air through the non-alkaline mixture to produce a copius rapid settling bluish black precipitate, and separating, washing and drying the resultant precipitate to provide a water insoluble bluish black pigment.

2. In the manufacture of pigment, the method which comprises mixing a water solution of ferrous sulphate with substantially the chemical equivalent amount of an alkali metal compound active to form ferrous hydroxide by reaction with the ferrous sulphate, then adding tannin extract derived from chestnut wood to the reaction mixture while agitating the same to provide a non-alkaline mixture, bubbling air through the mixture to produce a copious rapid settling bluish black precipitate, and separating, washing and drying the resultant precipitate to form a solid water insoluble bluish black pigment.

3. In the manufacture of pigment, the method which comprises mixing a water solution of ferrous sulphate with an alkali metal compound active to form ferrous hydroxide by reaction with the ferrous sulphate, then adding tannin extract derived from deciduous woods to the reaction mixture while agitating the same to provide a non-alkaline mixture, bubbling air through the non-alkaline mixture with the formation of a water insoluble bluish black precipitate, filtering the mixture while hot to separate the precipitate, washing the separated precipitate with water, and spray drying the washed precipitate.

4. In the manufacture of pigment, the method which comprises mixing ferrous hydroxide with tannin extract derived from chestnut wood to provide a non-alkaline mixture, bubbling air through the non-alkaline mixture to produce a copious bluish black precipitate, filtering off the resultant precipitate and washing the same, agitating the wet precipitate to reduce the particle size thereof, atomizing the agitated precipitate through a current of highly heated air into a current of cooler air, and separating the dried particles of the precipitate from the air current.

5. In the manufacture of pigment, the method which comprises mixing a water solution of a ferrous compound with an alkaline black liquor resulting from the cooking of fibrous material as in the conventional soda process for paper making, to produce ferrous hydroxide, admixing therewith a tannin extract resulting from the leaching of chestnut wood to provide a non-alkaline mixture, passing an oxidizing gas such as air through the non-alkaline mixture to produce a copious bluish black precipitate, and separating, washing and drying the precipitate to provide a water insoluble bluish black pigment.

6. In the manufacturing of pigment, the method which comprises mixing a pigment-metal compound of the group consisting of ferrous hydroxide, titanium chloride, vanadium trichloride, ammonium vanadate, mercurous nitrate, and cuprous chloride with a non-alkaline tannin extract solution to provide a non-alkaline mixture, bubbling an oxidizing gas such as air through the non-alkaline mixture to produce a copious rapid settling precipitate, separating the precipitate from the solution, and drying the separated precipitate to form a solid water insoluble pigment.

7. In the manufacturing of pigment, the method which comprises separating the sludge which settles out of tannin extract derived from chestnut wood, admixing this sludge with a pigment-metal compound of the group consisting of ferrous hydroxide, titanium chloride, vanadium trichloride, ammonium vanadate, mercurous nitrate, and cuprous chloride, to provide a non-alkaline mixture, passing an oxidizing gas such as air through the non-alkaline mixture to form a copious rapid settling precipitate, and separating, washing and drying the precipitate to produce a water insoluble pigment.

8. A pigment comprising the water insoluble bluish black precipitate which is the reaction product resulting from mixing ferrous hydroxide with a tannin extract derived from deciduous wood to provide a non-alkaline mixture, and then bubbling an oxidizing gas such as air through the non-alkaline mixture.

9. A pigment comprising the water insoluble bluish black precipitate which is the reaction product resulting from mixing ferrous hydroxide with a tannin extract derived from chestnut wood to provide a non-alkaline mixture, and then bubbling an oxidizing gas such as air through the non-alkaline mixture.

CHARLES A. THOMAS.
CARROLL A. HOCHWALT.